(12) United States Patent
Sardelli

(10) Patent No.: US 11,236,000 B2
(45) Date of Patent: Feb. 1, 2022

(54) PROCESS AND APPARATUS FOR WET OXIDATION OF WASTES

(71) Applicant: 3V GREEN EAGLE S.P.A., Milan (IT)

(72) Inventor: Franco Sardelli, Bergamo (IT)

(73) Assignee: 3V GREEN EAGLE S.P.A., Milan (IT)

( * ) Notice: Subject to any disclaimer, the term of this patent is extended or adjusted under 35 U.S.C. 154(b) by 453 days.

(21) Appl. No.: 16/318,442

(22) PCT Filed: Jul. 14, 2017

(86) PCT No.: PCT/IB2017/054282
§ 371 (c)(1),
(2) Date: Jan. 17, 2019

(87) PCT Pub. No.: WO2018/015859
PCT Pub. Date: Jan. 25, 2018

(65) Prior Publication Data
US 2021/0214256 A1    Jul. 15, 2021

(30) Foreign Application Priority Data
Jul. 19, 2016    (IT) .................. 102016000075748

(51) Int. Cl.
*B01J 3/00*      (2006.01)
*C02F 1/72*      (2006.01)
*C02F 11/08*     (2006.01)

(52) U.S. Cl.
CPC .............. *C02F 11/08* (2013.01); *B01J 3/008* (2013.01); *C02F 1/72* (2013.01);
(Continued)

(58) Field of Classification Search
CPC .................. C02F 11/08; C02F 2209/10; C02F 2201/002; C02F 2209/02; C02F 2209/03; C02F 1/72; C02F 1/725; C02F 1/727; C02F 1/74; C02F 11/06; C02F 2209/08; B01J 3/008; B01J 3/00; B01J 3/006; B01J 3/02; B01J 3/04; B01J 19/00; B01J 19/0053; B01J 19/0066; B01J 19/02; B01J 2219/00162; B01J 2219/00164; B01J 2219/00479; B01J 2219/00493;
(Continued)

(56) References Cited

U.S. PATENT DOCUMENTS 4,229,296 A * 10/1980 Wheaton ............... B01J 3/04
                                                   210/104
5,614,087 A *  3/1997 Le ...................... B01J 19/0073
                                                   210/180
(Continued)

FOREIGN PATENT DOCUMENTS

CN    204185356 U    3/2015
EP      1609765 A1  12/2005
(Continued)

*Primary Examiner* — Joseph W Drodge
(74) *Attorney, Agent, or Firm* — Elmore Patent Law Group, P.C.; Joseph C. Zucchero; Carolyn S. Elmore

(57) ABSTRACT

A new wet oxidation process of wastes, specifically of mixtures of at least two, liquid (wastewaters) and dense (sludges), pumpable wastes is described. An apparatus useful for a wet oxidation process of this type is also described.

17 Claims, 4 Drawing Sheets

(52) U.S. Cl.
CPC .... *C02F 2201/002* (2013.01); *C02F 2209/02* (2013.01); *C02F 2209/03* (2013.01); *C02F 2209/10* (2013.01)

(58) Field of Classification Search
CPC ........ B01J 2219/00889; B01J 2219/089; B01J 2219/3325
See application file for complete search history.

(56) References Cited

U.S. PATENT DOCUMENTS

| | | | | | |
|---|---|---|---|---|---|
| 5,674,405 | A | * | 10/1997 | Bourhis | ................... C02F 1/025 210/761 |
| 5,820,761 | A | * | 10/1998 | Holzer | ................... C02F 11/08 210/631 |
| 6,139,755 | A | * | 10/2000 | Marte | ................... C02F 1/025 210/181 |
| 7,442,314 | B2 | * | 10/2008 | Sardelli | ................... C02F 1/72 210/761 |
| 2004/0055968 | A1 | | 3/2004 | Campo et al. | |
| 2005/0279714 | A1 | * | 12/2005 | Sardelli | ................... C02F 1/02 210/761 |
| 2005/0282035 | A1 | * | 12/2005 | Evangelisti | ............. B01J 3/008 428/660 |
| 2007/0210010 | A1 | * | 9/2007 | Miyake | ................... B01J 23/40 210/762 |
| 2009/0301974 | A1 | | 12/2009 | Belkhodja et al. | |
| 2010/0018933 | A1 | * | 1/2010 | Titmas | ................. B01J 19/2475 210/761 |
| 2021/0078890 | A1 | * | 3/2021 | Lundqvist | ............... C10L 9/086 |
| 2021/0087093 | A1 | * | 3/2021 | Lundqvist | ............... C10L 9/086 |

FOREIGN PATENT DOCUMENTS

| | | |
|---|---|---|
| EP | 1611947 A1 | 1/2006 |
| EP | 1695943 A2 | 8/2006 |
| EP | 1695944 A1 | 8/2006 |
| JP | 2003312843 A | 11/2003 |
| KR | 10-2008-011826 A | 12/2008 |

* cited by examiner

PROCESS AND APPARATUS FOR WET OXIDATION OF WASTES

BACKGROUND OF THE INVENTION

The present invention relates to a new wet oxidation process of wastes, specifically of mixtures of at least two, liquid (wastewaters) and dense (sludges), pumpable wastes, and an apparatus useful for carrying out such process.

Within the scope of the present description and the subsequent claims, the term "wet oxidation" is intended to mean an oxidation in wet phase or "humid oxidation", i.e. an autocatalytic process leading to the oxidative demolition of organic or inorganic substances present in a liquid phase, by using oxygen (or, as an alternative, air) as oxidizing gas.

Within the scope of the present description and the subsequent claims, the term "COD" is intended to mean "Chemical Oxygen Demand", i.e. the chemical oxygen demand expressing the amount of oxygen in mg/l of water needed for the complete demolition of the organic or inorganic substances present.

Within the scope of this description and the subsequent claims, the term "multi-stream waste suspension" is intended to mean a mixture of at least two different types of wastes, preferably wastewaters and sludges.

STATE OF THE ART

Biological wastewater treatment plants, for wastewaters of both civil and industrial origin, produce during their normal operation an excess of suspended biomass which is systematically extracted from the production cycle, and which takes the name of surplus activated sludge. These sludges are characterized by the organic solids content (denoted by the ratio VDM/TDM, i.e. volatile dry matter/total dry matter), which is usually comprised between 60% and 75%, and the remaining 25% to 40% consists of inorganic solids.

Once extracted from the plant, surplus activated sludges are usually thickened, filtered, or centrifuged. Only thickened sludges can be treated directly by wet oxidation because they are dense but still pumpable liquids.

The wet oxidation process is in itself exothermic but, in order to operate within industrially acceptable times, it is necessary to heat the waste, conventionally by means of heat exchangers. Unlike wastewaters, sludge have the disadvantage of being very encrusting for surfaces of heat exchanger used to heat them, causing in a short time a reduction in their effectiveness that forces frequent cleaning, resulting in economic expense and loss in facility efficiency.

Usually, in reactors for wastewater wet oxidation, there is a co-current liquid and gas flow.

The European Patent Application No. 1695944 in the name of the Applicant describes a wet oxidation process suitable for transforming surplus activated sludges into a substantially inorganic and inert powder.

The European Patent Application No. 1609765 in the name of the Applicant describes a wet oxidation process suitable for treating at least two wastes, which are different one to the other at least for input temperature and COD.

SUMMARY OF THE INVENTION

With regard to the wet oxidation processes of the state of the art, the Applicant noted that such procedures limit the possibility of decontaminating different wastes at the same time, thus triggering an undesirable increase in costs.

Traditional oxidation processes also have technical disadvantages associated, for example, with heat exchanger fouling as well as deposition of solid compounds produced during heating on the surfaces of each component of the plant.

In addition, the Applicant also found that in the case of sludge feeding, in order to prevent solid accumulation, a system must be adopted to transfer them out of the reactor.

However, the nature of the fed waste does not allow, due to potential massive fouling, the adoption of static mixing systems able to increase locally the rate and the transport of solids.

Dynamic (mechanical) mixing from the outside would require the use of high-pressure and high temperature running mixers and/or circulation pumps, requiring expensive and complex sealing systems to be installed and managed. Moreover, the abrasive nature of suspended solids would result in a considerable wear of the mechanical devices.

The Applicant has therefore decided to address the issue, and provide a new wet oxidation process for the combined treatment of a suspension of liquid (wastewater) and dense (sludge) wastes which is able to reduce and/or solve the above-mentioned drawbacks.

Within the scope of the present description and the subsequent claims, the expression "suspension of at least two wastes" is intended to mean a mixture of at least two different types of wastes, i.e. sludges of biological origin (or different origin, provided that they are characterized by a high organic matter content) mixed with wastewaters resistant to biological oxidation.

This type of waste is characterized by a certain amount (more or less high) of inorganic solids accompanying the organic matrix.

While organic solids are fully destroyed, or solubilized following partial destruction, inorganic solids are not substantially attached by the oxidation reaction that leaves virtually unchanged the inorganic solids content of the fed suspensions.

The solution adopted by the Applicant provides for the inversion of the waste suspension flow in the reactor, i.e. the suspension is fed into the reactor from the top and discharged from the bottom. In this way, the solids in the suspension are transferred outside of the reactor by the flow of the liquid itself.

Accordingly, the present invention relates, in its first aspect, to a wet oxidation process according to claim 1; preferred features of the process are reported in the dependent claims.

More specifically, the wet oxidation process for decontamination of a multi-stream waste suspension according to the invention comprises the steps of:

a) feeding a stream of a pumpable suspension of at least two wastes, having a total dry matter (TDM) comprised between 5 and 18%, preferably between 7 and 15%, and a COD comprised between 10,000 and 150,000 mg/l, preferably between 30,000 and 150,000 mg/l, into a reactor at a temperature of at least 70° C., and at a pressure comprised between 8 bar and 100 bar, preferably between 30 bar and 65 bar, wherein said suspension is fed into the reactor by means of at least one first mixing ejector;

b) feeding a gas phase stream comprising oxygen and high-pressure steam into said reactor, at a pressure comprised between 8 bar and 100 bar, preferably between 30 bar and 65 bar, and at a temperature comprised between 150° C. and 315° C., preferably between 200° C. and 260° C., wherein said gas phase is fed into the reactor by means of at least one second mixing ejector;

c) placing in contact said suspension stream and said gas phase stream into said reactor, so as to flow said streams in countercurrent;

d) extracting the decontaminated suspension, after oxidation, from the lower bottom of the reactor;

e) extracting the exhaust gases from the upper bottom of the reactor.

Within the scope of this description and the subsequent claims, the term "exhausted gas" is intended to mean gas produced by the reaction plus saturation steam.

The reactor operates at a pressure comprised between 8 bar and 100 bar, preferably between 30 bar and 65 bar, and at a temperature comprised between 150° C. and 300° C., preferably between 200° C. and 260° C.

In a preferred embodiment, the pumpable suspension of at least two waste streams is fed from an inlet positioned on the upper bottom of the reactor.

In a preferred embodiment, the gas phase is fed from an inlet positioned on the lower bottom of the reactor.

Alternatively, the suspension of at least two wastes and the gas phase is fed into the reactor by means of lateral inlets.

In a preferred embodiment, the process according to the invention further comprises the step of preheating the suspension to be decontaminated at a temperature of at least 70° C., preferably comprised between 90° C. and 110° C. Preferably, said preheating step is carried out by means of at least one direct steam injection into the suspension.

In a preferred embodiment of the process according to the invention, the suspension preheated to a temperature of at least 70° C., preferably comprised between 90° C. and 110° C., is brought to a reaction pressure comprised between 8 bar and 100 bar by means of a pump, preferably between 30 bar and 65 bar (for example, an alternative piston pump, alternative flat or tubular membrane pump, multistage centrifuge). Alternatively, said preheating step is carried out by means of at least two steam injections. The first is carried out at atmospheric, or slightly higher pressure (preferably less than 3 bar), thus bringing the waste to a temperature of at least 70° C., preferably comprised between 90° C. and 110° C., the second injection is made with high-pressure steam (steam pressure at least above the reactor operating pressure) produced from demineralized water in a suitable evaporator heated by direct flame, with diathermic oil, or electrical resistances, thus bringing the waste to a temperature comprised between 180° C. and 260° C.

Said at least one high-pressure steam injection may take place before feeding the suspension into the reactor and/or in the reactor itself and/or in the oxygen supply line.

Advantageously, the Applicant has found that the process according to the present invention allows the reactor to run regularly for long periods of time, without showing any major fouling issues and/or accumulation of solids on the bottom.

In fact, by the process according to the invention it is possible to eliminate the issues associated with heat exchanger fouling, specifically by carrying out the heating by means of direct injection of high-pressure steam instead of using heat exchangers. In the process according to the invention, oxygen or air may be used as oxidizing gas. Preferably, oxygen.

Advantageously, the use of pure oxygen as an oxidant allows to use a smaller size and lower operating pressure reactor, thus obtaining lower exhaust gas emissions and a better exhaust gas use with respect to what would be achieved by using air.

The use of pure oxygen as a comburent (rather than air) improves kinetics and use of reaction heat, however, it may exhibit greater safety risks, if not handled appropriately.

This means that, in other wet oxidation technologies, oxygen is used only for mono-stream plants and for plants running under medium/low temperature and pressure conditions.

The start-up phases are obviously the most delicate from this point of view, since the transient must be managed between absence of reaction and a stable reaction; in these difficult situations, the oxygen concentration in the reactor may be difficult to control, and this may generate fugitive gas phase reactions or combustion reactions, if there are components made of titanium in the reactor or other parts of the plant.

In a further preferred embodiment, the process according to the invention further comprises, upstream of step a), the step $a_0$) of feeding water, compressed air, and high-pressure steam into a reactor, at a pressure comprised between 30 and 80 bar, until the reaction temperature and pressure are reached.

Advantageously, start-up according to step $a_0$) is carried out supplying clean water by means of the plant feeding pump (centrifugal, or alternative piston and/or membrane pump) through the normal supply pipeline or through specially provided equipment and pipeline. At the same time, compressed air, by means of a suitable high-pressure compressor, and high-pressure steam are fed until the reaction temperature and pressure are reached.

The Applicant also found that, thanks to the above specific features of the process according to the invention, it is possible to achieve a number of very beneficial technical effects, including:

to be able to simultaneously treat, in the same plant, mixtures of various types of liquid (wastewaters) and dense (sludges) wastes;

to be able to safely feed to the plant wastewaters with high content of soluble salts (first of all chlorides) that pose a potential risk of corrosion;

to be able to directly feed into the reactor a portion of wastewaters having characteristics incompatible with preheating in heat exchangers;

to be able to feed to the plant wastewaters with high content of insoluble salts and compounds likely to give rise to substantial deposits on the surfaces of each plant component (heat exchangers, vessels, valves);

to be able to supply wastewaters with a content of organic and/or inorganic solids which, during heating, produce solid compounds that deposit on the surfaces of each plant component (heat exchangers, vessels, valves).

In a further embodiment of the process according to the invention, the pumpable suspension of at least two wastes, having a total dry matter (TDM) comprised between 5 and 18%, preferably between 7 and 15%, and a COD comprised between 10,000 and 150,000 mg/l, preferably between 30,000 and 150,000 mg/l, is produced by the steps of:

feeding a sludge suspension having a TDM comprised between 1% and 18%, produced from organic solid sludges having a TDM comprised between 15 and 40%, and wastewaters having a COD comprised between 10,000 and 120,000 mg/l, preferably between 30,000 and 120,000 mg/l, fed into at least one mixing tank comprising at least one agitator;

mixing said sludges and wastewaters at a rate sufficient to produce a pumpable suspension having a TDM comprised between 5 and 18%, preferably between 7 and 15%, and a COD comprised between 10,000 and 150,000 mg/l, preferably between 30,000 and 150,000 mg/l;

feeding said pumpable suspension into at least one storage tank, and mixing said suspension at a rate sufficient to keep it stable;

discharging said pumpable suspension of at least two wastes from said storage tank, and feeding said suspension to be decontaminated into a reactor.

Advantageously, in the preparation of the suspension to be decontaminated, purified water is replaced by a liquid waste that needs to be treated, thus achieving optimization both in technical and economic terms, since two types of waste, sludges and liquid wastes, are treated in the same plant.

In accordance with a second aspect thereof, the present invention relates to an apparatus according to claim 10 useful for carrying out the wet oxidation process as described above. Preferred features of the apparatus are set forth in the dependent claims according to the invention.

More specifically, the apparatus for carrying out a wet oxidation process of a multi-stream waste suspension to be decontaminated according to the invention comprises:

at least one oxidation reactor comprising an upper bottom and a lower bottom;

means for feeding said pumpable suspension of at least two wastes having a total dry matter (TDM) comprised between 5 and 18%, preferably between 7 and 15%, and a COD comprised between 10,000 and 150,000 mg/l, preferably between 30,000 and 150,000 mg/l, into said reactor, at a temperature of at least 70° C. and at a pressure comprised between 8 bar and 100 bar, preferably between 30 bar and 65 bar, comprising an inlet for said suspension being provided with at least one first mixing ejector;

means for injecting a gas phase comprising oxygen and high-pressure water steam inside said reactor, at a pressure comprised between 8 bar and 100 bar, preferably between 30 bar and 65 bar, and at a temperature comprised between 150° C. and 315° C., preferably between 200° C. and 260° C., comprising an inlet for said gas phase being provided with at least one second mixing ejector;

means suitable for removing the decontaminated suspension from the lower bottom of the reactor;

means suitable for removing the exhaust gases from the upper bottom of the reactor.

Advantageously, the apparatus according to the invention allows to carry out a new wet oxidation process having the very advantageous technical effects described above.

In a preferred embodiment, said at least one first mixing ejector for feeding said suspension of at least two wastes to be decontaminated is positioned in correspondence to the upper bottom of said reactor.

The liquid suspension fed into the oxidation reactor is at a temperature lower than that of the reaction environment, and has therefore a higher density. Feeding from the top of the reactor a liquid suspension denser than the surrounding liquid causes a rapid movement of the same downwards, i.e. towards the outlet, and consequently a by-pass (at least partial) of the reactor itself.

Advantageously, the adoption of a first mixing ejector according to the invention, wherein the fed suspension is the working fluid, and the water contained in the reactor is the sucked fluid, causes the mixing of the fed suspension with the one already in the reactor, making the temperature and, therefore, the density uniform.

With the apparatus according to the invention, the rapid flow downwards of the fed suspension is avoided, making the reaction environment more homogeneous and avoiding detrimental by-pass effects.

The Applicant also found that, thanks to the aforementioned specific features, it is possible to achieve a number of very advantageous technical effects compared to the use of static mixing systems positioned within the reactor.

In fact, such static systems would allow formation of solid deposits on the surfaces, that accumulate occupying volume and reducing the functionality of the same reactor.

In a preferred embodiment, said at least one second mixing ejector for injecting oxygen and high-pressure steam is positioned in correspondence to the lower bottom of said reactor.

With the apparatus according to the invention, the rapid gas ascension upwards, due to their lower density compared to the surrounding liquid, is avoided. In fact, this fast ascension would reduce the contact time between gas and liquid, and substantially reduce the efficiency of the reaction.

The Applicant also found that the use of static mixing systems for the phases circulating within the reactor would not prevent the rapid gas ascension upwards, and the issues mentioned above.

Advantageously, the adoption of a second mixing ejector, wherein the supplied gases are the working fluid, and the water contained in the reactor is the sucked fluid, allows an intense mixing of the fed gases and the water present in the reactor, effectively distributing oxygen and making the temperature of the reaction fluids uniform.

Preferably, the oxygen supply may be in gas or liquid state.

Gas oxygen supply can be obtained by means of a suitable compressor (alternative piston, or membrane, or centrifugal compressor).

Liquid oxygen supply, instead, can be obtained by means of a cryogenic pump. Such liquid supply is particularly preferred.

In a preferred embodiment, the means for injecting high-pressure water steam comprise at least one high-pressure steam generator (e.g., an evaporator).

Preferably, the inlet for said suspension is positioned on the upper bottom of the reactor.

Preferably, the inlet for the gas phase comprising oxygen and high-pressure steam is positioned on the lower bottom of the reactor.

Inlets from the bottoms are preferred with reactors made of special alloy coated materials.

Alternatively, the inlets for the suspension and the gas phase are positioned laterally in the reactor.

Side inlets are preferred with reactors entirely made of special alloys.

In a preferred embodiment, the outlet for the decontaminated suspension may be coaxial with the inlet of the gas phase comprising oxygen and steam.

In a preferred embodiment, the apparatus according to the invention further comprises means for preheating the suspension of at least two wastes at a temperature of at least 70° C., preferably comprised between 90° C. and 110° C. Examples of means that may be used for this purpose comprise a suitable heat exchanger, or a direct injection of low-pressure steam. Both systems can efficiently recover part of the heat produced by the oxidation reaction.

In a further preferred embodiment, the apparatus according to the invention further comprises means for pressurizing the preheated suspension to a value comprised between 8 bar and 100 bar, preferably between 30 bar and 65 bar. Examples of means that may be used for the purpose comprise, for example, a pump (for example, an alternative piston, an alternative flat or tubular membrane, or a multi-stage centrifugal pump).

In a preferred embodiment, the upper and lower bottoms of the reactor may be flat, convex, elliptical or spherical, welded or flanged.

Preferably, said reactor being manufactured in two superimposed parts, joined together by conventional junctions, of which the bottom part is made of, or internally coated by a titanium alloy, and the upper part is made of, or internally coated by a nickel alloy.

Such apparatus may therefore be used in combination with a coating, such as the one described in the European Patent Application No. 1611947 in the name of the Applicant, whose content is herein fully incorporated by reference.

In a preferred embodiment, the apparatus according to the invention for carrying out the start-up step described above further comprises means for feeding water, compressed air and high-pressure steam into the reactor, until the temperature and reaction pressure are reached.

Examples of means for feeding clean water into the reactor may be specially provided equipment and pipeline, or pipeline and equipment used for feeding the suspension are used.

An example of means for feeding compressed air into the reactor is a high-pressure compressor which, depending on the required delivery pressure, may be a rotatable or alternative compressor.

An example of means for feeding high-pressure steam into the reactor is a high-pressure steam generator (for example, a direct flame boiler, an evaporator heated by a diathermic oil, or an electrically heated evaporator).

In a further preferred embodiment, the apparatus according to the invention further comprises means for producing said pumpable suspension of at least two wastes, having a total dry matter (TDM) comprised between 5 and 18%, preferably between 7 and 15%, and a COD comprised between 10,000 and 150,000 mg/l, preferably between 30,000 and 150,000 mg/l, comprising:
- at least one mixing tank (pulper) comprising at least one first agitator for mixing sludges having a TDM comprised between 1 and 18%, produced from organic solid sludges having a TDM comprised between 15 and 40%, and wastewaters having a COD comprised between 10,000 and 120,000 mg/l, preferably between 30,000 and 120,000 mg/l, at a rate sufficient to produce a pumpable suspension having a TDM comprised between 5 and 18%, preferably between 7 and 15%, and a COD comprised between 10,000 and 150,000 mg/l, preferably between 30,000 and 150,000 mg/l;
- at least one storage tank comprising at least one second agitator for mixing said pumpable suspension at a rate sufficient to keep it stable.

As a mixing tank comprising at least one first agitator, a pulper (normally used to "pulp" solid materials, such as paper, cellulose pulp, limestone, clay, etc., in water, or another liquid) may be used, at a speed comprised between 200 and 400 rpm.

BRIEF DESCRIPTION OF THE DRAWINGS

Further features and advantages of the invention will be better illustrated by the following description of some preferred embodiments thereof, made below, by way of illustrative and non-limiting examples, with reference to the accompanying drawings. In such drawings.

DETAILED DESCRIPTION OF CURRENTLY PREFERRED EMBODIMENTS

In the following description, to illustrate the figures identical reference numbers are used to denote same meanings.

Different features in the individual embodiments may be combined together, as desired, according to the foregoing description, if one has to benefit from the specific advantages resulting from a specific combination.

Figure 1:
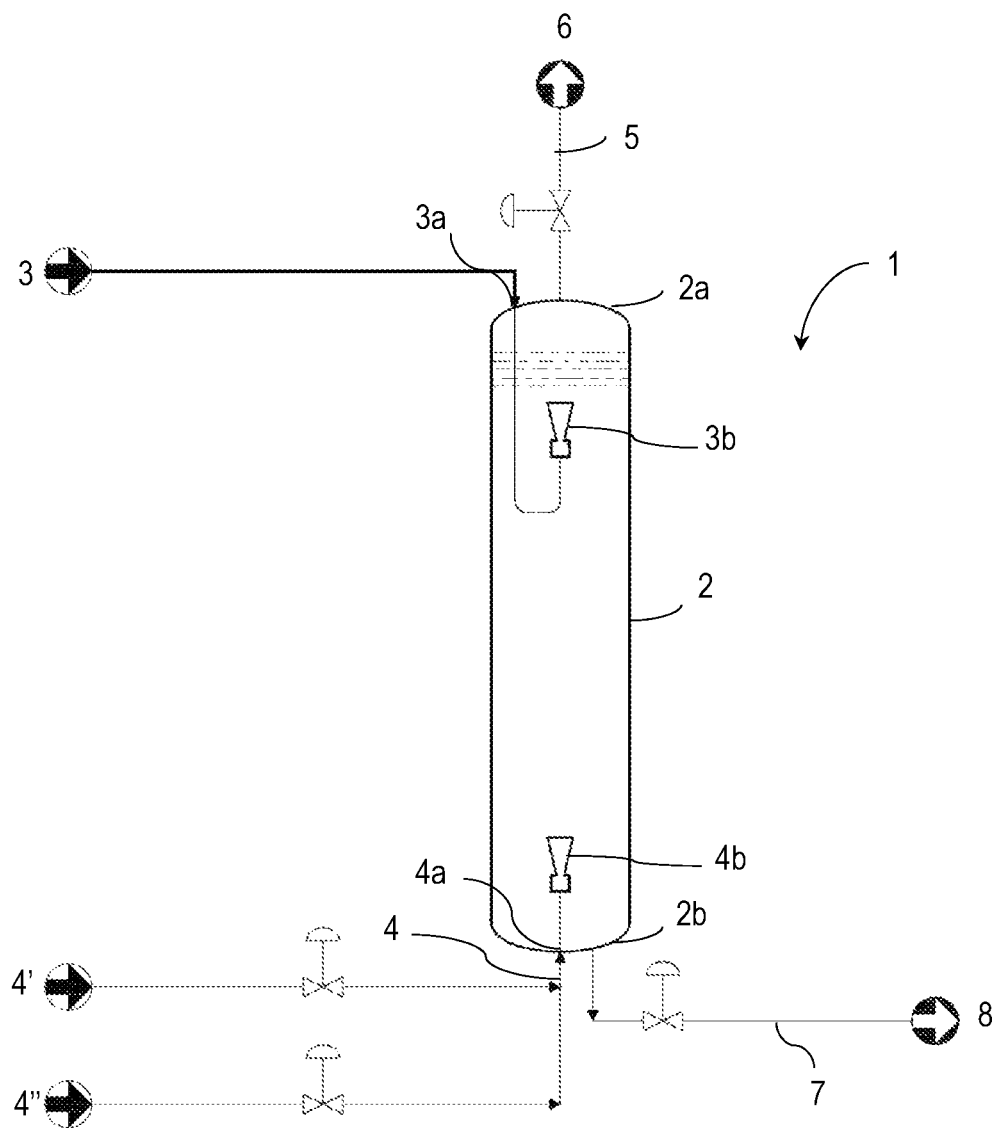
FIG. 1 is a schematic view of an apparatus for wet oxidation according to the process of the present invention.

With reference to FIG. 1, the process according to the invention is carried out with the aid of an apparatus 1 made up of at least one oxidation reactor 2 comprising an upper bottom 2a and a lower bottom 2b.

The upper 2a and lower 2b bottoms of the reactor 2 can be flat, convex, elliptical or spherical, welded or flanged.

In the wet oxidation reactor 2, a pumpable suspension 3 of at least two wastes, having a total dry matter (TDM) comprised between 5 and 18%, preferably between 7 and 15%, and a COD comprised between 10,000 and 150,000 mg/l, preferably between 30,000 and 150,000 mg/l, is fed at a temperature of at least 70° C., and at a pressure comprised between 8 bar and 100 bar, preferably between 30 bar and 65 bar, by means of an inlet 3a being provided with at least one first mixing ejector 3b, positioned in correspondence to the upper bottom of the reactor 2a.

At the same time, a gas phase 4 comprising oxygen 4' and high-pressure water steam 4" is injected into the reactor, at a pressure comprised between 8 bar and 100 bar, preferably between 30 bar and 65 bar, and at a temperature comprised between 150° C. and 315° C., preferably between 200° C. and 260° C., by means of an inlet 4a being provided with at least one second mixing ejector 4b, positioned in correspondence to the lower bottom of the reactor 2b.

Inlets from the bottoms 3a, 4a, are preferred with reactors made of special alloy coated materials.

Preferably, high-pressure steam 4" is produced by a high-pressure steam generator (for example, an evaporator) (not shown in FIG. 1).

Preferably, gas oxygen supply 4' can be obtained by means of a suitable compressor (alternative piston, or membrane, or centrifugal compressor). Alternatively, liquid oxygen supply 4' can be obtained by means of a cryogenic pump (not shown in FIG. 1).

FIG. 1 shows pipeline 5, suitable for removal of exhaust gases 6 from the upper bottom of the reactor 2a, and pipeline 7, suitable for removal of the decontaminated suspension 8 from the lower bottom of the reactor 2b.

In a preferred embodiment, outlet 7 for the decontaminated suspension 8 may be coaxial with inlet 4a for the gas phase 4 (not shown in FIG. 1).

Such a reactor 2, to carry out the wet oxidation process according to the invention, has already many advantages in itself. However, further advantages may be obtained if such a reactor is used in combination with a coating, such as the one described in the European Patent Application No. 1611947 in the name of the Applicant, whose content is herein fully incorporated by reference.

Such coating is characterized in that it comprises at least two different metal alloys, wherein a first alloy is selected from the group comprising titanium and alloys thereof (for example titanium-palladium, titanium-aluminum-vanadium, titanium niobium alloys, and mixtures thereof), and a second alloy is selected from the group consisting of nickel alloys (for example, nickel-chromium, nickel-chromium-molybdenum, nickel-chromium-iron alloy).

In a preferred embodiment, the coating consists essentially of non-superimposed surfaces of suitable thickness, wherein a first surface is preferably made up of titanium or alloys thereof, and a second surface is preferably made up of nickel alloys.

Advantageously, the coating thickness may not be uniform in all regions and, in any case, it is at least 0.75 mm, preferably comprised between 0.75 and 12.7 mm, more preferably equal to 5 mm.

In a particularly preferred embodiment, the lower part of the reactor is coated by titanium or alloys thereof, and the upper part of the reactor is coated by nickel alloys. Advantageously, titanium is particularly resistant to corrosion.

The nickel alloy, instead, is particularly stable in gas and vapor environments with high oxygen concentration.

According to a preferred embodiment, the two lower and upper regions of the reactor are made separately, and are then joined together by any method known in the art and used for this purpose, such as coupling and/or closure by means of flanges.

According to a preferred embodiment, the titanium-coated area is advantageously comprised between 5% and 95% of the internal reactor volume, and the nickel-coated area is advantageously comprised between 5% and 95% of the i internal reactor volume. Preferred ratios of the two coated areas are 10/90 and 20/80, wherein the largest portion may equally be titanium or nickel.

Alternatively, the wet oxidation reactor according to the invention may be entirely made of special alloys based on nickel and/or titanium.

Figure 2:
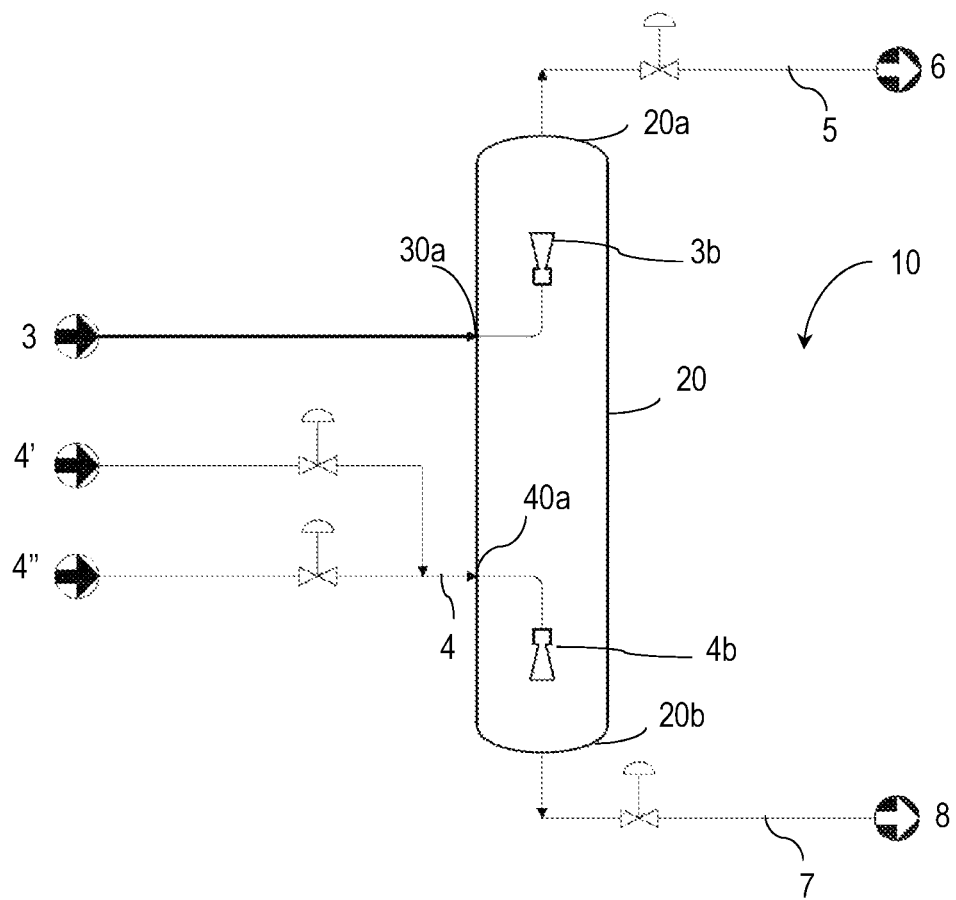
FIG. 2 is a schematic view of an apparatus for wet oxidation according to the process of the present invention.

With reference to FIG. 2, 10 globally refers to an apparatus according to an alternative embodiment of the invention consisting of at least one oxidation reactor 20 comprising an upper bottom 20a and a lower bottom 20b, wherein the inlet 30a for the suspension 3 and the inlet 40a for the gas phase 4, comprising oxygen 4' and high-pressure water steam 4", are positioned laterally in the reactor 20.

The same reference numbers have the same meanings as reported in FIG. 1.

Side entrances 30a, 40a are preferred with reactors entirely made of special alloys.

Figure 3:
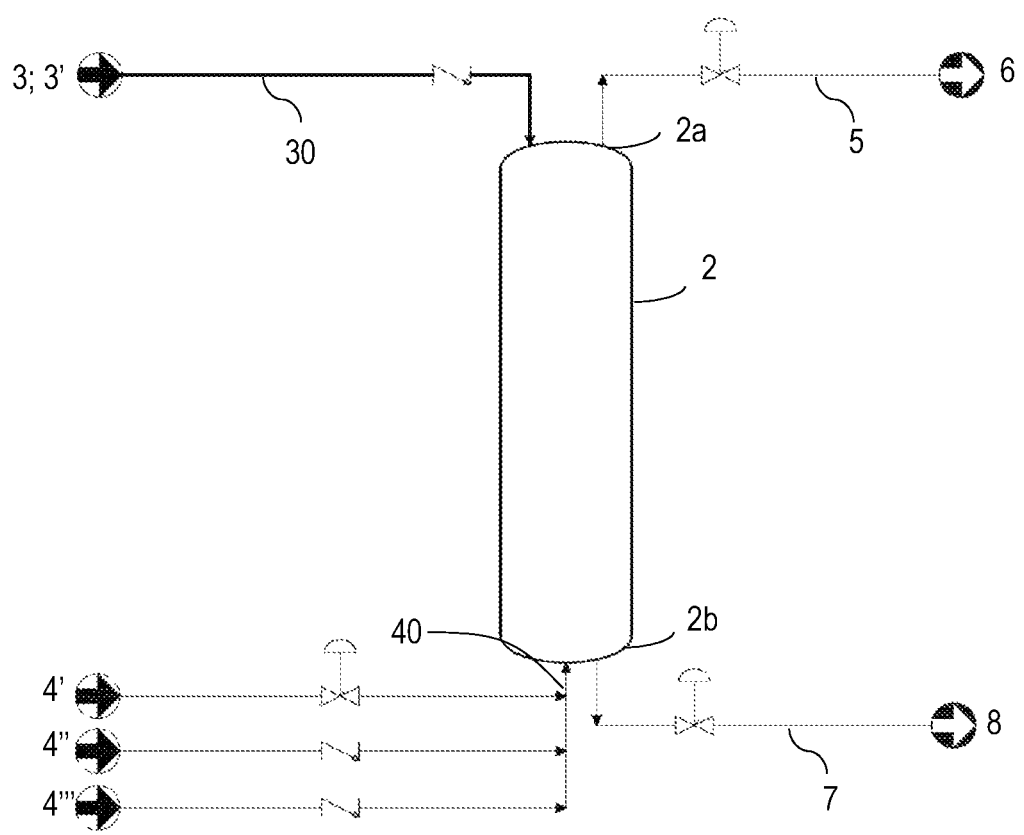
FIG. 3 is a schematic view of the start-up phase of the process according to the present invention.

With reference to FIG. 3, the start-up phase of the process according to the present invention is carried out by feeding water 3', compressed air 4''', and high-pressure steam 42 into reactor 2 (or into reactor 20 not shown in FIG. 3), at a pressure comprised between 30 bar and 80 bar, until the reaction temperature and pressure are reached.

Preferably, clean water 3' supply is carried out by means of the plant feeding pump (centrifugal, or alternative piston and/or membrane pump) (not shown in FIG. 3) through the normal supply pipeline 30.

Alternatively, the supply is carried out by means of specially provided equipment and pipeline (not shown in FIG. 3). At the same time, compressed air 4" is fed by means of a suitable high-pressure compressor (for example, a rotatable or alternative compressor), and high-pressure steam 4" by means of a high-pressure steam generator (for example, a direct flame boiler, an evaporator heated by a diathermic oil, or an electrically heated evaporator) (not shown in FIG. 3) through the oxygen pipeline 40, until the reaction temperature and pressure are reached.

Once the reaction conditions are reached, the suspension of at least two wastes 3, at steady flow rate, and the oxygen 4', at increasing flow rate, are fed until the planned amount is reached. In the reactor, clean water 3' is then gradually replaced by wastes 3 which react with oxygen 4' to give the oxidized suspension (decontaminated) 8, which is extracted from the lower bottom of reactor 2b (or from the lower bottom of reactor 20b not shown in FIG. 3), and exhaust gases 6, which are extracted from the upper bottom of reactor 2a (or from the upper bottom of reactor 20a not shown in FIG. 3).

Figure 4:
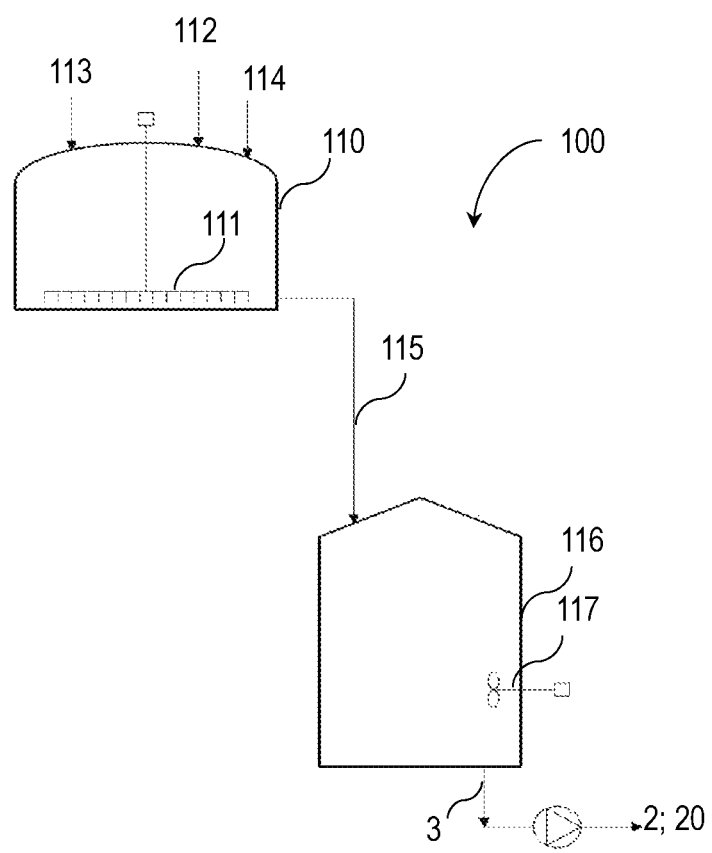
FIG. 4 is a schematic view of an apparatus for producing the pumpable suspension to be decontaminated by the process of the present invention.

With reference to FIG. 4, the apparatus 100 for producing a pumpable suspension 3 of at least two wastes, having a total dry matter (TDM) comprised between 5 and 18%, preferably between 7 and 15%, and a COD comprised between 10,000 and 150,000 mg/l, preferably between 30,000 and 150,000 mg/l, includes at least one mixing tank 110 comprising at least one first agitator 111 (for example, a pulper), wherein sludges 112 having a TDM comprised between 1 and 18%, produced from organic solid sludges 113 having a TDM comprised between 15 and 40%, and wastewaters 114 having a COD comprised between 10,000 and 120,000 mg/l, preferably between 30,000 and 120,000 mg/l, are fed.

In said at least one mixing tank 110, mixing is carried out at a rate sufficient to produce a pumpable suspension 115 having a TDM comprised between 5 and 18%, preferably between 7 and 15%, and a COD comprised between 10.000 and 150.000 mg/l, preferably between 30.000 and 150.000 mg/l. Preferably, at a rate comprised between 200 and 400 rpm.

The pumpable suspension 115 is then discharged from the mixing tank 110, and fed into at least one storage tank 116 comprising at least one second agitator 117.

After mixing said pumpable suspension 115 at a rate sufficient to keep it stable, the pumping suspension 3 is discharged from the storage tank 116, and fed into a reactor 2, 20.

The invention claimed is:
1. A wet oxidation process for decontaminating a suspension of multi-stream wastes comprising:
  a) preparing a suspension of at least two wastes by:
    i) feeding a sludge suspension having a total dry matter (TDM) comprised between 1% and 18%, produced from organic solid sludges having a TDM comprised between 15 and 40% and wastewaters having a chemical oxygen demand (COD) comprised between 10,000 and 120,000 mg/l, fed into at least one mixing tank comprising at least one agitator;
    ii) mixing said sludges and wastewaters at a rate sufficient to produce a suspension having a TDM comprised between 5 and 18%, and a COD comprised between 10,000 and 150,000 mg/l; and
    iii) feeding said suspension into at least one storage tank, and mixing said suspension at a rate sufficient to keep it stable;
  b) preheating the mixed suspension of at least two wastes by injecting at least one direct steam into the suspension;
  c) feeding a stream of the preheated suspension of at least two wastes into a reactor at a temperature of at least 70°

C., and at a pressure comprised between 8 bar and 100 bar, wherein said suspension is fed into the reactor by at least one first mixing ejector;

d) feeding a gas phase stream comprising oxygen and high-pressure steam into said reactor at a pressure comprised between 8 bar and 100 bar and at a temperature comprised between 150° C. and 315° C., wherein said gas phase is fed into the reactor by at least one second mixing ejector;

e) placing in contact said suspension stream and said gas phase stream into said reactor, so as to flow said streams in countercurrent;

f) extracting the decontaminated suspension, after oxidation, from a lower bottom of the reactor; and g) extracting exhaust gases from an upper bottom of the reactor.

2. The process according to claim 1, wherein said reactor operates at a pressure comprised between 8 bar and 100 bar, and at a temperature comprised between 150° C. and 300° C.

3. The process according to claim 1, wherein said at least one first mixing ejector is in communication with the reactor by an inlet positioned on the upper bottom of the reactor.

4. The process according to claim 1, wherein said at least one second mixing ejector is in communication with the reactor by an inlet positioned on the lower bottom of the reactor.

5. The process according to claim 1, wherein said suspension of at least two wastes, and said gas phase are fed into the reactor by lateral inlets.

6. The process according to claim 1, wherein the suspension is preheated to a temperature of at least 70° C.

7. The process according to claim 1, wherein the suspension is preheated by at least two direct steams.

8. The process according to claim 1, further comprising, upstream of step c), a step $c_0$) of feeding water, compressed air and high-pressure steam into the reactor, at a pressure comprised between 30 and 80 bar, until the reaction temperature and pressure are reached.

9. The process according to claim 1, wherein the suspension is preheated to a temperature between 90° C. and 110° C.

10. An apparatus for carrying out a wet oxidation process according to claim 1, comprising:
at least one mixing tank and at least one storage tank for producing said suspension of at least two wastes wherein:
the at least one mixing tank comprising at least one first agitator for mixing sludges having a TDM comprised between 1 and 18%, produced from organic solid sludges having a TDM comprised between 15 and 40%, and wastewaters having a COD comprised between 10,000 and 120,000 mg/l, at a rate sufficient to produce a suspension having a TDM comprised between 5 and 18%, and a COD comprised between 10,000 and 150,000 mg/l; and
the at least one storage tank comprising at least one second agitator for mixing said suspension at a rate sufficient to keep it stable;
at least one oxidation reactor comprising an upper bottom and a lower bottom;
a direct steam injector for preheating the mixed suspension of at least two wastes;
at least one first mixing ejector comprising an inlet for feeding said preheated suspension of at least two wastes into said at least one oxidation reactor, at a temperature of at least 70° C., and at a pressure comprised between 8 bar and 100 bar;
at least one second mixing ejector comprising an inlet for injecting a gas phase comprising oxygen and high-pressure water steam inside said reactor, at a pressure comprised between 8 bar and 100 bar, and at a temperature comprised between 150° C. and 315° C.;
a pipeline for removing the decontaminated suspension from the lower bottom of the reactor; and
a pipeline for removing the exhaust gases from the upper bottom of the reactor.

11. The apparatus according to claim 10, wherein said at least one first mixing ejector for feeding said suspension of at least two wastes is positioned at the upper bottom of said reactor.

12. The apparatus according to claim 10, wherein said at least one second mixing ejector for injecting oxygen and high-pressure steam is positioned at the lower bottom of said reactor.

13. The apparatus according to claim 10, wherein said inlet for said suspension is positioned on the upper bottom of the reactor.

14. The apparatus according to claim 10, wherein said inlet for said gas phase is positioned on the lower bottom of the reactor.

15. The apparatus according to claim 10, wherein said inlets for the suspension and for the gas phase are positioned laterally in the reactor.

16. The apparatus according to claim 10, wherein the direct steam injector is configured to preheat the suspension of at least two wastes to a temperature of at least 70° C.

17. The apparatus according to claim 10, wherein the direct steam injector is configured to preheat the suspension of at least two wastes to a temperature between 90° C. and 110° C. laimed specific total dry matter (TDM) and chemical oxygen demand (COD) ranges claimed.

* * * * *

UNITED STATES PATENT AND TRADEMARK OFFICE
CERTIFICATE OF CORRECTION

PATENT NO. : 11,236,000 B2
APPLICATION NO. : 16/318442
DATED : February 1, 2022
INVENTOR(S) : Franco Sardelli It is certified that error appears in the above-identified patent and that said Letters Patent is hereby corrected as shown below:

In the Claims

Column 12, Claim 17, Line 50: After "110° C." please delete "laimed specific total dry matter (TDM) and chemical oxygen demand (COD) ranges claimed."

Signed and Sealed this
Tenth Day of May, 2022

Katherine Kelly Vidal
*Director of the United States Patent and Trademark Office*